(12) United States Patent
Thoms

(10) Patent No.: US 10,422,360 B2
(45) Date of Patent: Sep. 24, 2019

(54) DISPLACEMENT CONTROL UNIT

(71) Applicant: Danfoss Power Solutions G.m.b.H & Co. OHG, Neumünster (DE)

(72) Inventor: Reinhardt Thoms, Holzbunge (DE)

(73) Assignee: Danfoss Power Solutions G.m.b.H & Co. OHG, Neumünster (DE)

(*) Notice: Subject to any disclaimer, the term of this patent is extended or adjusted under 35 U.S.C. 154(b) by 309 days.

(21) Appl. No.: 15/260,710

(22) Filed: Sep. 9, 2016

(65) Prior Publication Data

US 2017/0089367 A1 Mar. 30, 2017

(30) Foreign Application Priority Data

Sep. 28, 2015 (DE) .................. 10 2015 218 576

(51) Int. Cl.
| | |
|---|---|
| *F16K 11/07* | (2006.01) |
| *F15B 15/14* | (2006.01) |
| *F15B 15/20* | (2006.01) |
| *F16K 17/04* | (2006.01) |
| *F15B 13/044* | (2006.01) |

(52) U.S. Cl.
CPC ........ *F15B 15/202* (2013.01); *F15B 13/0442* (2013.01); *F15B 15/1447* (2013.01); *F16K 17/04* (2013.01); *F16K 11/0716* (2013.01); *Y10T 137/86694* (2015.04)

(58) Field of Classification Search
CPC .... F16K 17/04; F16K 11/0716; F15B 15/202; F15B 13/0442; F15B 15/1447; Y10T 137/86614; Y10T 137/86622; Y10T 137/8667; Y10T 137/86694; Y10T 137/86702

USPC ........... 137/625.64, 625.65, 625.25, 625.68; 251/30.01, 25–29, 62
See application file for complete search history.

(56) References Cited

U.S. PATENT DOCUMENTS

| 4,537,220 | A | 8/1985 | Anderson |
| 2002/0066441 | A1 | 6/2002 | Tyler |
| 2006/0130914 | A1* | 6/2006 | Barber ................ F15B 9/12 |
| | | | 137/625.64 |

(Continued)

FOREIGN PATENT DOCUMENTS

| CN | 101151464 A | 3/2008 |
| CN | 101403223 A | 4/2009 |

(Continued)

*Primary Examiner* — Kevin F Murphy
*Assistant Examiner* — Kelsey E Cary
(74) *Attorney, Agent, or Firm* — McCormick, Paulding & Huber LLP

(57) ABSTRACT

A Control unit of a hydraulic unit comprises a control piston slidable arranged in a control cylinder to provide a hydraulic fluid under servo pressure at a first outlet of the control unit suitable for the displacement of the hydraulic unit. The servo pressure is proportional to a sum of the inner forces of the hydraulic unit and the operational forces act on the control unit. The hydraulic fluid provided at the outlet is fed by a charge pressure supply at charge pressure at an inlet of the control unit. The control piston has a blind bore in the direction of a longitudinal axis of the control unit, in which a pressure relief valve is arranged functioning as a pilot-control unit having a two-sided pressure relief piston arranged in the blind bore and slidable relative to the control piston by means of an actuator.

21 Claims, 3 Drawing Sheets

(56) References Cited

U.S. PATENT DOCUMENTS

2007/0199601 A1* 8/2007 Imhof .................. G05D 7/0133
                                                            137/625.64
2010/0224059 A1* 9/2010 Kurz ........................ F15B 9/10
                                                              91/363 R

FOREIGN PATENT DOCUMENTS

| CN | 102099232 A | 6/2011 |
| DE | 3402508 A1 | 8/1984 |
| DE | 10127907 A1 | 12/2002 |
| DE | 102008050835 A1 | 4/2010 |
| DE | 102011056209 A1 | 6/2012 |
| DE | 102014019615 A1 | 6/2016 |
| EP | 1067293 A2 | 1/2001 |

* cited by examiner

DISPLACEMENT CONTROL UNIT

CROSS REFERENCE TO RELATED APPLICATION

Applicant hereby claims foreign priority benefits under U.S.C. § 119 from German Patent Application No. 102015218576.1 filed on Sep. 28, 2015, the content of which is incorporated by reference herein.

TECHNICAL FIELD

The present invention relates to a control unit comprising a control piston arranged slidable in a control cylinder to enable the guidance of hydraulic fluid under servo pressure to servo unit of the controlled displacement of a hydraulic unit. The servo pressure provided at a first outlet of the control unit is proportional to a sum of the inner forces on the control unit and operational forces acting thereon. Thereby, the hydraulic fluid guided to the outlet is fed by a charge pressure supply to an inlet of the control unit.

BACKGROUND

Such a control unit is known, e.g. from DE 10 2008 050 835 A1 and DE 101 27 907 A1.

Hydraulic units and components thereof, such as hydrostatic pumps, hydrostatic motors, hydrostatic valves or power cylinders are often operated in explosion prone environments or in areas with risk of explosions. Therefore, they must be designed according to specific guidelines for the prevention of explosions. With respect to electrical devices this implies that the electrical power used in the controls are to be prevented to provoke an explosion, usually, for instance, by extensive and costly capsulation of the same requiring at the same time big installation space. In this case extensive protective measures are required such as explosion proof casings for the components. This permits the utilization of energies, high enough to ensure control forces sufficiently high for the actuation of valves or other hydraulic control devices. Transferring this to electrical proportional displacement controls, which are utilized frequently, e.g. in variable displacement pumps, this implies bulky casings for the isolation of proportional solenoids and of all related electrical contacts and power lines.

Alternatively, the electrical energy applied is reduced till that point at which possible ignition sparks are too weak to cause an explosion. This case is termed "intrinsically safe". However, this alternative has a reduced energy level for generating control forces. Hence, such a solution of an explosion proof design has often the drawback that limited energies are often not sufficient to provide forces high enough for a reliable, high quality control/displacement of a hydraulic unit. Further, these relatively weak control forces are susceptible to superposition of external disturbances, further reducing the quality of control.

To adapt a common non-explosion-safe electrical proportional displacement control to an intrinsically safe design several aspects would have to be optimized. Spring forces would have to be reduced/adjusted to the level of available magnetic forces due to the low electrical energy usable to provide actuator forces. Furthermore, disturbances of any kind must be reduced and/or shielded sufficiently from the control unit in order to not generate disturbances. Reduction of mechanical friction and flow forces has to be done as well. Further, inertial forces would have to be reduced also, because they act with or against the magnetic forces, depending on the orientation of the displacement. All these efforts for such an approach with low electrical power would be substantial, however only marginally successful.

A different approach to achieve actuating forces sufficiently high for an intrinsically safe control unit design with small currents is e.g. the introduction of a hydraulic pilot or boost stage. Such a pilot or boost stage is described for example in DE 34 02 508. A hydraulic pilot valve within the control unit of a hydraulic machine with a variable displacement is also known from DE 10 2008 050 835 A1. Here, the proportional solenoids are relatively high powered and consequently not inherently safe. Further, the pilot stage pressure relief valve is situated remote from the main parts of the proportional adjustment, hence building a bulky system. Thus, the above mentioned prior art solutions have the draw-back that they are relatively bulky and/or not intrinsically safe.

SUMMARY

It is therefore an object of the present invention to provide a control unit that utilizes relatively low actuating forces, e.g. low electric currents. However, sufficiently high displacement forces should be generated to guarantee a high quality of control for the displacement of a hydraulic unit. Further, the inventive control unit should comprise a small number of components, should be robust in design, should be cost effective and, preferably, should be capable of being integrated in the control unit of a hydraulic unit. It is a further objective of the present invention that control units of already existing hydraulic devices should be easily changeable/adaptable to a control unit according to the present invention.

The objects are solved by a control unit according to claim 1, whereas preferred embodiment are given in the subclaims depending directly or indirectly on claim 1.

To that end, the control unit according the introduction part of claim 1 of to the present invention is based on a commonly known non-intrinsically safe control unit. Differing from such a control unit, the control unit according to the invention is characterized in that the control piston has at least at one front end a longitudinal blind bore in the longitudinal direction of the control unit. In this blind bore a pressure relief valve is arranged functioning as a pilot-control unit. For that, a two-sided pressure relief piston is arranged slidable in the longitudinal blind bore relative to the control piston by means of an actuator. By displacing the pressure relief piston relative to the control piston charge pressure is guided on both front faces of the pressure relief piston, i.e. on the distal and the medial front side, and on the distal end of the control piston as a hydraulic set pressure. Thereby, the control piston is displaced in the control cylinder by the sum of the pressure forces caused by the set pressure acting on the distal front side of the control piston and on both front faces of the pressure relief piston, and caused by the force of the actuator assisting in direction of displacement of the pressure relief piston.

The invention provides a solution to the above mentioned drawbacks of the state of the art and, in case of using electrical energy, is intrinsically safe. It is significant that the force of an electrical, hydraulical, pneumatical and/or mechanical actuator is lower than the force required to displace the control piston in the control cylinder. Consequently, according to the invention, the relatively low operational forces provided by the actuator are augmented/boosted by hydraulic forces provided by the pilot stage, in particular by the help of the inventive arrangement of a pressure relief valve inside a longitudinal blind bore of the control piston. These amplifying forces are generated internally in the control unit, preferably, in the longitudinal blind hole of the control piston. More preferably, the control piston used in the present invention is of an external design of control pistons used in control units known in the state of the art, not being intrinsically safe.

According to the invention, the actuator of the inventive control unit does not act directly on the control piston of the proportional displacement unit as this is usual in control units known in the state of the art. The actuator according to the invention displaces a pressure relief piston being integrated in the control piston and being slidable relative to the same. Thereby, the pressure relief piston acts together with the longitudinal blind bore in the control piston as a pilot valve. If the pressure relief piston is displaced relative to the control piston, the pressure relief piston opens a conduit from the charge pressure supply at the inlet of the control unit via the front faces of the pressure relief piston to the front side of the control piston. Heretofore, the pressure relief piston comprises a longitudinal bore fluidly connecting the distal and medial front faces of the pressure relief piston. On both front faces of the pressure relief piston pressure chambers are arranged inside the blind bore of the control piston, which can be pressurized by hydraulic fluid supplied via the charge pressure inlet of the control unit.

The pressure chamber at the distal end of the control piston, into which the distal front end of the pressure relief piston protrudes, is of bigger diameter. Hence, the hydraulic force generated in the pressure chamber at the distal end is higher than the hydraulic force generated in the pressure chamber at the internal, medial end of the pressure relief piston. Hence, if pressurized hydraulic fluid is guided by the longitudinal bore of the pressure relief piston to both front ends, i.e. to both pressure chambers, a hydraulic force additional to the actuator force is generated in direction of the intended displacement of the control piston. According to the invention the height of this hydraulic force is determined by the magnitude of displacement of the pressure relief piston by means of the actuator. At the same time the pilot pressure generates on the internal front face—the medial face of the pressure relief piston—which is remote to the actuator, a hydraulic counterforce against the actuator force, which, as already mentioned above, is smaller than the hydraulic force generated by the pilot pressure on the distal front face.

As the pressure relief piston according to the invention is pressurized on both front faces with hydraulic fluid under pressure coming preferably from the charge supply, the effective force to displace the pressure relief piston depends on the difference of size of the two front faces. In a preferred embodiment of the invention the pressure relief piston is of a stepped design, which means, it shows two front faces of different size. Hereby, the medial front face of the pressure relief piston being on the remote side of the actuator is smaller than the distal front face on which the actuator acts directly or indirectly. Thus, the difference in diameter of the two front faces of the pressure relief piston influences the height of the counterforce against the actuator—as the pressure level acting on both front faces is the same. Reversely, as the permissible actuator force for avoiding explosions in a dangerous environment is limited, this defines the size of a ring surface on the pressure relief piston effectively generating the hydraulic counterforce against the actuator force. In other words, the difference in size of the two front faces of the pressure relief piston multiplied by set pressure plus the mechanical force of a pressure relief valve spring may not be higher as the permissible actuator force available for an intrinsically safe design of the inventive control unit.

If the two front faces of the pressure relief piston are of the same size and the same pressure is acting on both front faces no hydraulic counterforce against the actuator force is generated and would have to be achieved, solely by a pressure relief spring. However, such a pressure relief spring is foreseen in the inventive control unit to bias the pressure relief piston into its closed position, in which the conduit for hydraulic fluid through the longitudinal bore of the pressure relief piston is disabled and a depressurizing of the medial pressure chamber via an outlet to an area of low pressure is enabled. Further, if the actuator should be balanced only by resilient forces of the pressure relief spring, these forces have to be as low as actuator forces are available. Due to internal (friction) forces during the displacement of the pressure relief piston, this would not lead to a robust design with high quality of the control unit according to the invention. Therefore, according to the invention the pressure effective front faces of the pressure relief piston are of different size. This can be achieved by using a pressure relief piston with a stepped design or by shielding off parts of the medial front face from the hydraulic set pressure, e.g. by a plunger remitting the actuator force on the pressure relief piston.

Finally, the forces acting on the control piston to displace the same in medial orientation result from the diameter of the control piston, the pilot pressure acting thereon plus the force from the actuator on the pressure relief piston. If the pressure relief piston is guided in a bushing mounted design, e.g. as cartridge design within the blind bore of the control piston, the set pressure acts on a front surface of that bushing in so far this front surface builds part of the front side of the control piston.

In a preferred embodiment of the invention the pressure reducing valve piston is guided in a pressure relief valve bushing arranged in the blind bore of the control piston wherein hydraulic fluid under set pressure can be conducted via set pressure relief groves in the pressure relief valve bushing to a low pressure outlet of the control unit being in fluid connection with a region of low pressure, e.g. a tank or the housing of a hydraulic unit.

The invention makes it possible to adapt the conventional design of an electrical proportional displacement control unit in order to use (very) small control forces with only minimal modifications. Preferably, a control piston according to the invention fits into existing control units. Thus, an existing design can be adapted easily to the requirements of inherent safe and an explosion proof construction. Inherent security is advantageous because it requires no casing or shielding of electrical components, such as solenoids, power lines or plugs. Furthermore, it is easier to operate in practice. With an inherently safe design it is possible for example to open or close electrical contacts without having to shut down the hydraulic unit.

As easily can be seen by a person skilled in the art the inventive idea is applicable not only to EDC-Systems (Electronic Displacement Control-Systems) for achieving intrinsically safeness, since also to Systems whose hydraulic, pneumatic, hydro-mechanic or electrical actuator forces are desired to be augmented without causing big modifications on the control unit. Also reverse use is covered by the present invention idea. In case, it would be desired to lower the actuation forces, e.g. by changing the way of providing the actuator forces of the control unit, for instance changing from hydraulically generated operational forces to pneumatically, mechanically or manually generated ones. As could be seen by a person with relevant skills in the art, the scope of the inventive idea is not limited to control units being foreseen to be used in an explosion prone environment.

BRIEF DESCRIPTION OF THE DRAWINGS

In the following, without limiting the inventive idea, the invention is described in more detail with the aid of a preferred embodiment and with reference to the appended drawings in which.

DETAILED DESCRIPTION

Figure 1:
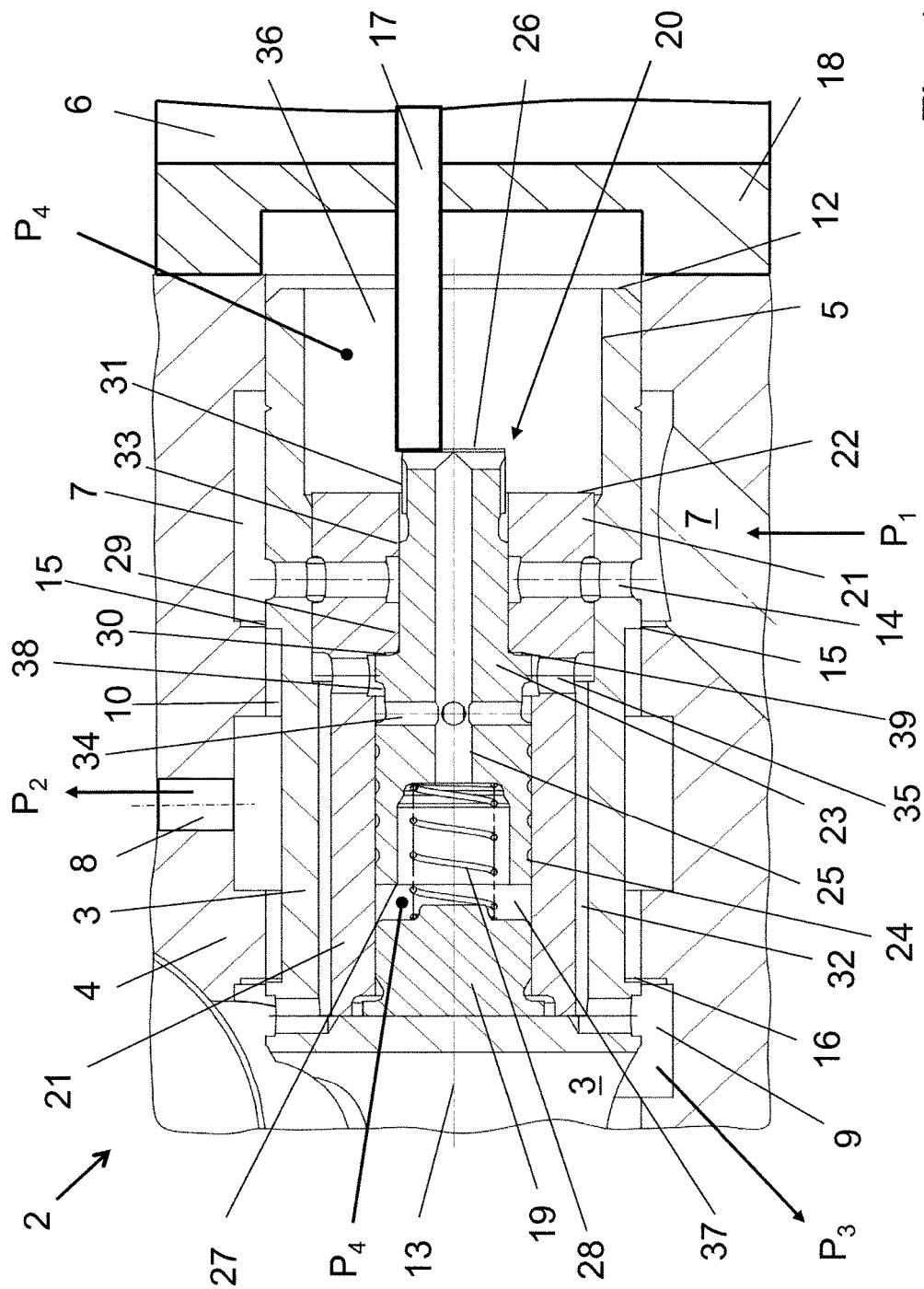
FIG. 1 shows a partial cross section of an embodiment of a control unit according to the invention in a first operational state.
Figure 2:
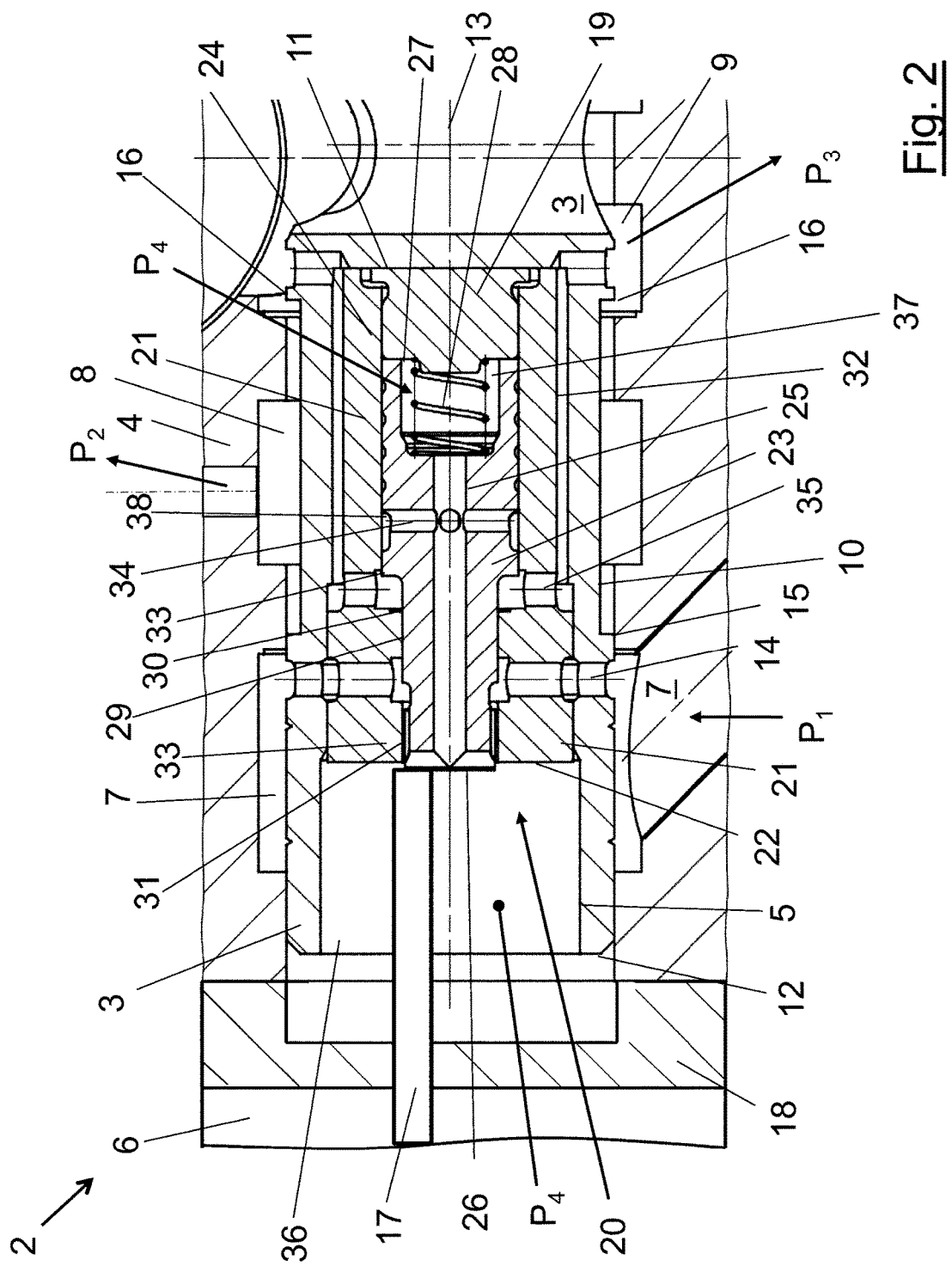
FIG. 2 shows a partial cross section of a control unit according to the invention in a second operational state.
Figure 3:
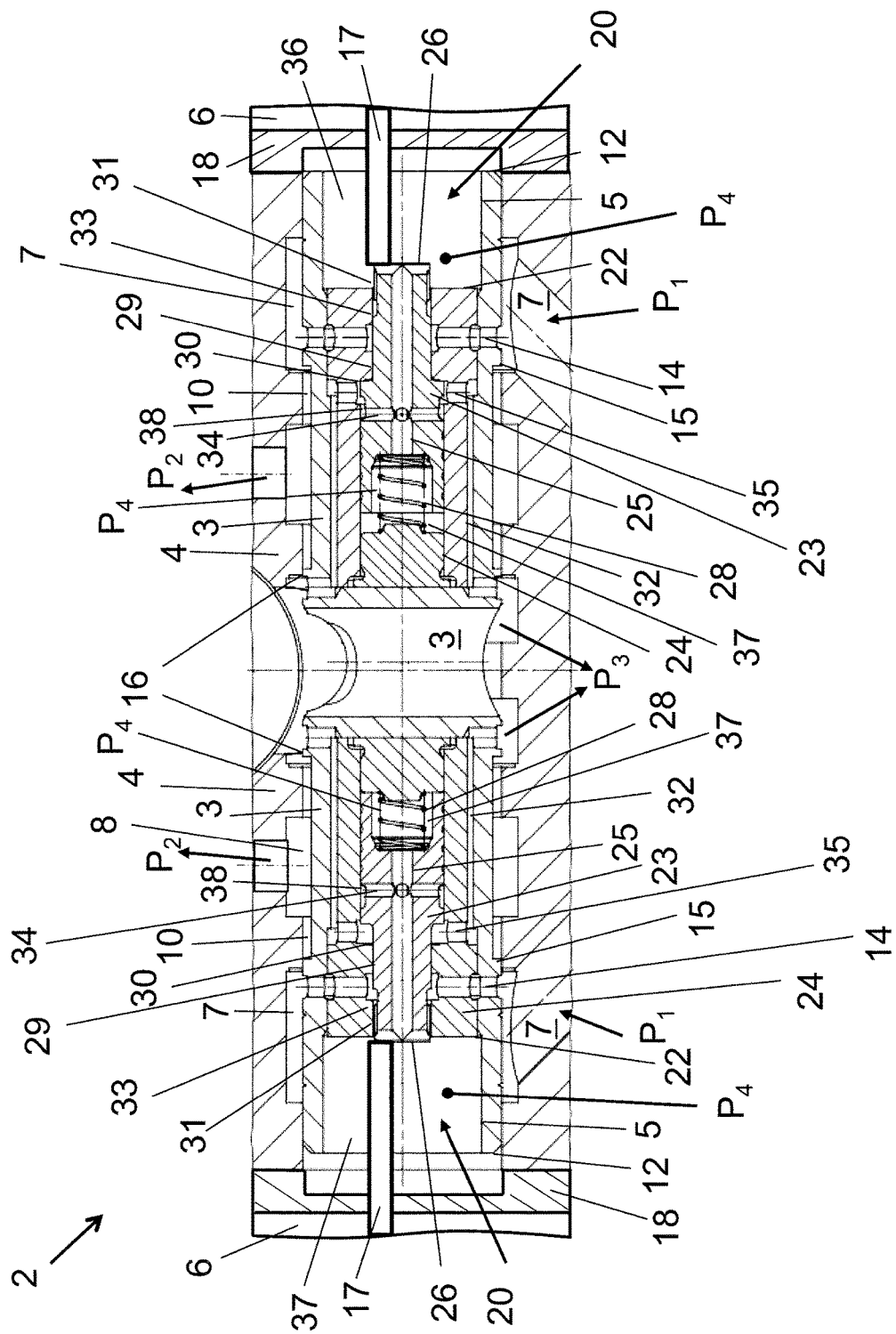
FIG. 3 shows a cross section of a symmetrical control unit according to the invention in the second operational state.

FIG. 1 shows a partial cross section of an embodiment of a control unit 2 according to the invention. Shown is the right side of generally symmetrical control unit 2 that comprises a common control cylinder 4 in which a movable and generally symmetrical control pistons 3 is arranged, as depicted in FIG. 3. The control piston 3 exemplarily shown in FIGS. 1 to 3 is used for the displacement control of hydraulic units, e.g. in hydrostatic pumps or motors with reversible hydraulic fluid flow.

The in FIG. 1 depicted right side of control unit 2 shows the right half of a control piston 3 that is slidable guided in a control cylinder 4. An inherently safe actuator 6 acts solely and indirectly on control piston 3 by means of a plunger 17. The displacement of the control piston 3 connects/disconnects certain conduits for hydraulic fluid to adjust the displacement of the hydraulic unit. These connections are opened or closed by control edges 15, 16 being defined by ring grove 10 machined in the outer surface of control piston 3. Hydraulic fluid is supplied for instance by charge pump (not shown) under charge pressure $P_1$ to an inlet 7 arranged in control cylinder 4 and can be guided as a servo pressure $P_2$ to an outlet 8. The pressure level of servo pressure $P_2$ is proportional to the displacement of the control piston 3 relative to control cylinder 4. A further outlet 9 leads to a region of low pressure being at a pressure $P_3$, generally denoted as sump, tank or casing. These features and the general mode of operation of a control unit are familiar to a person skilled in the art so that further details can be omitted here.

The control unit 2 according to FIG. 1 differs from a conventional control unit in that it includes a hydraulic pilot stage or a pre-control unit in form of a pressure relief valve 20 that is slidable arranged in a longitudinal blind bore 5 of control piston 3. The blind bore 5 is oriented along the longitudinal axis 13 of control unit 2. The pressure relief valve 20 comprises a pressure relief piston 23 slidable arranged in a bushing 21, which is mounted axially fixed in the blind bore 5 of control piston 3. One end face of bushing 21 is seated against the bottom 11 of blind bore 5. This end face of bushing 21 exemplarily is closed by an end cap 19, which also serves as a seat for a pressure relief valve spring 28. A radial bore 14 extend from the control piston 3 via the bushing 21 to the control piston 3 and connects inlet 7 for charge pressure $P_1$ with a longitudinal bore 24 in bushing 21. Pressure relief piston 23 is slidable arranged in bore 24.

Exemplarily, pressure relief piston 23 is of a stepped design, what means, it has a first, distal front face 26 and a second, medial front face 27 of different diameter. Distal front face 26 is the smaller one of the two front faces 26, 27 and is oriented towards a plunger 17 of actuator 6. Plunger 17 solely contacts pressure relief piston 23 and only on distal front face 26. Plunger 17 can act to displace pressure relief piston 23 along the longitudinal axis 13 of control unit 2 by exerting medial oriented forces on distal end face 26. Pressure relief piston 23 further comprises a through bore 25 leading from the distal front face 26 to the medial front face 27. At the medial front face 27 through bore 25 shows an enlarged diameter in order to accommodate pressure relief spring 28 acting to bias pressure relieve piston 23 in the direction of plunger 17. Radial bores 34 in pressure relief piston 23 fluidly connect a recessed circumferential area 38 on pressure relief piston 23 with through bore 25. Area 38 can overlap a radial bore 35 in bushing 21 leading to outlet 9 connected with an area of low pressure. This overlap depends on the relative position of pressure relief piston 23 in bushing 21 and is present if pressure relief piston 23 is in the closed position. In case of an overlap of recessed area 38 and radial bore 35 a fluid connection is established between through bore 25 and second outlet 9 at case pressure $P_3$. This will be described further on in more detail below.

The circumferential surface 29 of pressure relief piston 23 is stepped, by virtue of which different diameters of the medial front face 26 and the distal front face 27 are achieved. Simultaneously defining a ring shaped area 30 in the insection area of the two diameters. A corresponding ring shaped shoulder 39 is present in the longitudinal bore 24 of bushing 21 such that the ring area 30 can abut on the ring shaped shoulder 39, thus limiting the distal stroke of pressure relief piston 23 relative to bushing 21 and control piston 3 inside which bushing 21 is fixedly arranged. The ring shaped area 30 is permanently in fluid connection with the second outlet 9 through radial bore 35.

At the distal end section of pressure relief piston 23 near distal front face 26 a notch 31 is formed on the outer surface of pressure relief piston 23 defining a set pressure control edge 33. Notch 31 can be brought into an overlapping relationship with radial bore 14 in bushing 21 thereby fluidly connecting inlet 7 with notch 31. When such an overlap occurs, hydraulic fluid from the inlet 7 is guided via radial bore 14 traversing control piston 3 and bushing 21 to a distal pressure chamber 36 in longitudinal blind bore 5 of control piston 3 closed by a flange 18. In distal pressure chamber 36 hydraulic fluid under set pressure $P_4$ can act on the front side 12 of control piston 3, on the free front face 22 of bushing 21 and, guided further on along notch 31, on distal front face 26 of pressure relief piston 23. The pressure level of set pressure $P_4$ is established by the magnitude of displacement of pressure relief piston 23 with respect to control piston 3. The bigger the displacement of pressure relief piston 23 relative to bushing 21 the higher the pressure level of set pressure $P_4$ in distal pressure chamber 36 and in the regions in direct communication therewith, such as though bore 25 in pressure relief piston 23 and in medial pressure chamber 37. By means of through bore 25 set pressure $P_4$ is guided from the distal chamber 36 to medial pressure chamber 37 located between the medial front face 27 of pressure relief piston 23 and the end cap 19 of bushing 21. Hence, set pressure P4 is also acting on medial front face 27 of pressure relief piston 23.

The state of operation of control unit 2 depicted in FIG. 1 shows the pilot stage or boost of control forces for the displacement of the hydraulic unit inactive. In this state ring area 30 of bushing 21 and ring shaped shoulder 39 of pressure relief piston 23 are in contact. Consequently pressure relief piston 23 is in its extreme distal position. In this inactive situation set pressure control edge 33 does not overlap with radial bore 14. Thus, no hydraulic fluid can flow from radial bore 14 via set pressure notch 31 into distal pressure chamber 36. In this closed position of pressure relief valve 20 the distal pressure chamber 36 is vented via through bore 25, via radial bores 34 and 35 and via set pressure relief notch 32 to outlet 9 connected to a region of low pressure, i.e. case pressure $P_3$. Thus, low pressure at pressure level $P_3$ is present in both pressure chambers 36 and 37. Consequently, set pressure $P_4$ in this inactive state of the inventive control unit 2 is essentially equal to low pressure level $P_3$. Further, servo pressure $P_2$ is not influenced because control edge 15 does not overlap with inlet 7 for system pressure $P_1$.

FIG. 2 shows a cross section of the left side of a control unit 2 according to the invention in a second active operational state. In this operational state the pilot stage or boost of control forces on control piston 3 is active on this side of control unit 2. Because control unit 2 is constructed symmetrically the same reference numerals used in FIG. 1 are used for corresponding features in FIG. 2 and, consequently, also in FIG. 3.

In FIG. 2 actuator 6 pushes plunger 17 actively against the first front end 26 of pressure relief piston 23. Pressure relief piston 23 is displaced in medial direction against the force of biasing spring 28. This causes an overlap between notch 31 and radial bore 14 conducting hydraulic fluid under system pressure $P_1$. Thus the hydraulic pressure level in pressure chamber 36 raises and establishes a set pressure level $P_4$ in pressure chamber 36 being fed by charge pressure $P_1$ present at inlet 7. Simultaneously, with the overlap of notch 31 and radial bore 14 the overlap of recessed area 38 and radial bore 35 is set aside, so that the pressure level in pressure chamber 36 cannot be vented to the low pressure outlet 9. However, the pressure level $P_4$ in pressure chambers 36 and 37 is communicated via through bore 25 in pressure relief piston 23. Hence, the pressure in pressure chamber 37 corresponds to set pressure $P_4$ in pressure chamber 36 and acts on medial front face 27 of pressure relief piston 23.

The displacement of pressure relief piston 23 also closes a flow channel for hydraulic fluid leading from through bore 25 via radial bores 34 and 35 to pressure relief notch 32 defined as a region 38 of reduced outer diameter of bushing 21. Pressure relief notch 32 communicates in turn with second outlet 9 at case pressure $P_3$. Because this flow channel is closed, pressure $P_4$ is acting on the medial front face 27 of pressure relief piston 23. On the distal front face 26 of pressure relief piston 23 the same set pressure $P_4$ acts on distal front face 26 as well as on front face 22 of bushing 21 and on the remaining ring front face 12 of control piston 3.

According to the operating condition/state of FIG. 2, the effective force acting in medical direction on control piston 3 is given by the sum of the hydraulic forces generated by set pressure P4 on front side 12 of control piston 3, on front face area 22 of bushing 21 and on front face 26 of pressure relief piston 23, i.e. the whole cross section area of pressure chamber 36, plus the mechanical force of actuator 6 on plunger 17. In distal direction the forces are given by the product of the area of the medial front face 27 of pressure relief piston 23 multiplied with the set pressure $P_4$ plus the force of pressure relief spring 28. As the sum of pressure sensitive faces in the medial area is smaller than the sum of pressure sensitive faces in the distal area, the resulting force is oriented towards the center of control unit 2 and pushes control piston 3 to the right, as shown in FIG. 3.

The force acting on control piston 3 is triggered by the actuator force of actuator 6 acting on pressure relief piston 23 whose displacement is causing the hydraulic forces on the control piston 3. The role of actuator 6 is generally reduced to displace pressure relief piston 23 in bushing 21. The generated value of set pressure $P_4$ is proportional to the amount of displacement of pressure relief piston 23 relative to control piston 3. Thus, the force provided by actuator 6, preferably a solenoid, is boosted considerably by the controlled supply of hydraulic pressure on the front faces of control piston 3. This permits the use of a relatively low actuator forces which require low electrical power, if using an inherently safe solenoid.

FIG. 3 shows a cross section of a complete control unit 2 according to the invention in the operational active state of FIG. 2. The symmetrical control piston 3 is displaced to the right, as shown in FIG. 2, which is indicated by the spacing of the dot-dashed lines representing the respective symmetry axes of control piston 3 and control cylinder 4. This displacement causes an overlap of inlet port 7 for hydraulic fluid under charge pressure $P_1$ with a region 10 of reduced diameter on control piston 3 being bordered by control edge 15. Thus, hydraulic fluid is conducted from the right inlet port 7 to the first right outlet 8 under servo pressure $P_2$, the pressure level of which is determined—as usual—by the amount of displacement of control edge 15 of the control piston 3 relative to control cylinder 4.

However, the preferred embodiment shown in FIGS. 1 to 3 is explained in detail, a person skilled in the art detects that the scope of the inventive idea is not limited to this embodiment. In the shown embodiment, bushing 21, end cap 19, pressure relief piston 23 and pressure relief spring 28 can be fixed axially as a pre-mounted assembly group 20, i.e. as premounted pressure relief valve 20, into blind bore 5 of control piston 3. Nevertheless, a person skilled in the art easily would find a way to incorporate at least parts of pressure relief valve 20 into control piston 3, thereby reducing the amount of parts. Hence, all such embodiments of the present invention are also covered by the inventive idea, which is using a pressure relief valve 20 for generating an additional hydraulic force on control piston 3 triggered the actuator force for the controlled displacement of a hydraulic unit. Hereby, the use of charge pressure $P_1$ is not limited to a pressure supply being generated by a charge pump. As a charge pressure $P_1$, generally spoken, every pressure in a hydraulic unit being higher than ambient pressure serves to generate a boosting effect in the sense of the present invention.

It is understood that the invention can also be used in conjunction with other kinds of actuators instead of proportional solenoids using low currents. Also switching solenoids are covered by the inventive idea, opening the possibility of switchable hydraulic controls, however, eventually disabling a proportional control of the hydraulic unit. Also, an application for the operation of switchable valves using pneumatical, hydro-mechanical, mechanical, etc. actuator forces for initiating the inventive boost effect fall under the scope of the invention.

As already stated above, the inventive idea is not limited to hydrostatic machines as hydrostatic pumps or motors. The inventive idea is applicable as well to every kind of hydraulic units like hydraulic cylinders, e.g. for the movement of charges.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A control unit of a hydraulic unit comprising a control piston slidable arranged in a control cylinder to provide a hydraulic fluid under servo pressure at a first outlet of the control unit suitable for the displacement of the hydraulic unit, wherein the servo pressure is proportional to a sum of the inner forces of the hydraulic unit and the operational forces acting on the control unit, and wherein the hydraulic fluid provided at the outlet is fed by a charge pressure supply at charge pressure at an inlet of the control unit,
wherein the control piston has a blind bore in the direction of a longitudinal axis of the control unit, in which blind bore a pressure relief valve is arranged functioning as a pilot-control unit having a two-sided pressure relief piston arranged in the blind bore and slideable relative to the control piston by means of an actuator, such that by displacement of the pressure relief piston reduced charge pressure acts as a hydraulic set pressure both on a medial front face and on a distal front face of the pressure relief piston and acts on front faces of the control piston, whereas the control piston is displaceable in the control cylinder by the sum of the pressure forces generated by of the set pressure and the force of the actuator.

2. The control unit as claimed in claim 1, wherein the actuator is a proportional solenoid that acts on the distal front face of the pressure relief piston.

3. The control unit as claimed in claim 2, wherein the actuator is configured to generate control forces by receiving electrical energy at a low power level too weak to cause an explosion.

4. The control unit as claimed in claim 3, wherein the force of the actuator is less than the force required to displace the control piston in the control cylinder.

5. The control unit as claimed in claim 3, wherein the pressure relief piston is biased and held in an initial position by a pressure relief spring acting on a second medial front face of said pressure relief piston.

6. The control unit as claimed in claim 3, wherein a lateral surface of the pressure relief piston is in fluid connection with an inlet for hydraulic fluid under charge pressure through a radial bore in the control piston and that hydraulic fluid is guidable to the distal front face of the pressure relief piston by a set pressure groove in the lateral surface.

7. The control unit as claimed in claim 2, wherein the force of the actuator is less than the force required to displace the control piston in the control cylinder.

8. The control unit as claimed in claim 2, wherein the pressure relief piston is biased and held in an initial position by a pressure relief spring acting on a second medial front face of said pressure relief piston.

9. The control unit as claimed in claim 2, wherein a lateral surface of the pressure relief piston is in fluid connection with an inlet for hydraulic fluid under charge pressure through a radial bore in the control piston and that hydraulic fluid is guidable to the distal front face of the pressure relief piston by a set pressure groove in the lateral surface.

10. The control unit as claimed in claim 1, wherein the force of the actuator is less than the force required to displace the control piston in the control cylinder.

11. The control unit as claimed in claim 10, wherein the pressure relief piston is biased and held in an initial position by a pressure relief spring acting on a second medial front face of said pressure relief piston.

12. The control unit as claimed in claim 10, wherein a lateral surface of the pressure relief piston is in fluid connection with an inlet for hydraulic fluid under charge pressure through a radial bore in the control piston and that hydraulic fluid is guidable to the distal front face of the pressure relief piston by a set pressure groove in the lateral surface.

13. The control unit as claimed in claim 1, wherein the pressure relief piston is biased and held in an initial position by a pressure relief spring acting on a second medial front face of said pressure relief piston.

14. The control unit as claimed in claim 13, wherein a lateral surface of the pressure relief piston is in fluid connection with an inlet for hydraulic fluid under charge pressure through a radial bore in the control piston and that hydraulic fluid is guidable to the distal front face of the pressure relief piston by a set pressure groove in the lateral surface.

15. The control unit as claimed in claim 1, wherein a lateral surface of the pressure relief piston is in fluid connection with an inlet for hydraulic fluid under charge pressure through a radial bore in the control piston and that hydraulic fluid is guidable to the distal front face of the pressure relief piston by a set pressure groove in the lateral surface.

16. The control unit as claimed in claim 1, wherein the pressure relief piston comprises a through bore in the direction of the longitudinal axis of the control unit, by which through bore hydraulic fluid is guidable from the distal front face to the medial front face of the pressure relief piston.

17. The control unit as claimed in claim 1, wherein the pressure relief piston is guided in a pressure relief bushing arranged in the blind bore of control piston, wherein hydraulic fluid under set pressure is guidable via set pressure relief grooves in the pressure relief bushing to a second outlet of the control unit that is in fluid connection with a region of low pressure.

18. The control unit as claimed in claim 17, wherein pressure relief piston comprises a radial bore, by which radial bore hydraulic fluid is guidable from the through bore to the second outlet.

19. The control unit as claimed in claim 17, wherein pressure relief piston has two regions of different diameter, wherein the medial front face, the distal front face and a ring shaped area in a region connecting the regions of different diameter are exposable to said set pressure and the ring shaped area is permanently in fluid connection with the second outlet.

20. The control unit as claimed in claim 19, wherein the medial front face is the bigger front face of the pressure relief piston.

21. The control unit as claimed in claim 1, wherein the pressure relief piston is slideable throughout a plurality of positions such that the inlet of the control unit is fluidly connected to the distal front face of the pressure relief piston in at least one position of the plurality of positions.

* * * * *